May 4, 1943.  L. P. MILLARD ET AL  2,318,409
SELF-PROPELLED HARVESTER-THRESHER
Filed Oct. 13, 1941  6 Sheets-Sheet 1

Inventors
Lee P. Millard
Stuart S. Pool
By Paul O. Pippel
Atty.

May 4, 1943.  L. P. MILLARD ET AL  2,318,409
SELF-PROPELLED HARVESTER-THRESHER
Filed Oct. 13, 1941  6 Sheets-Sheet 3

Inventors
Lee P. Millard
Stuart L. Pool
By Paul O. Pippel
Atty.

May 4, 1943. L. P. MILLARD ET AL 2,318,409
SELF-PROPELLED HARVESTER-THRESHER
Filed Oct. 13, 1941 6 Sheets-Sheet 4
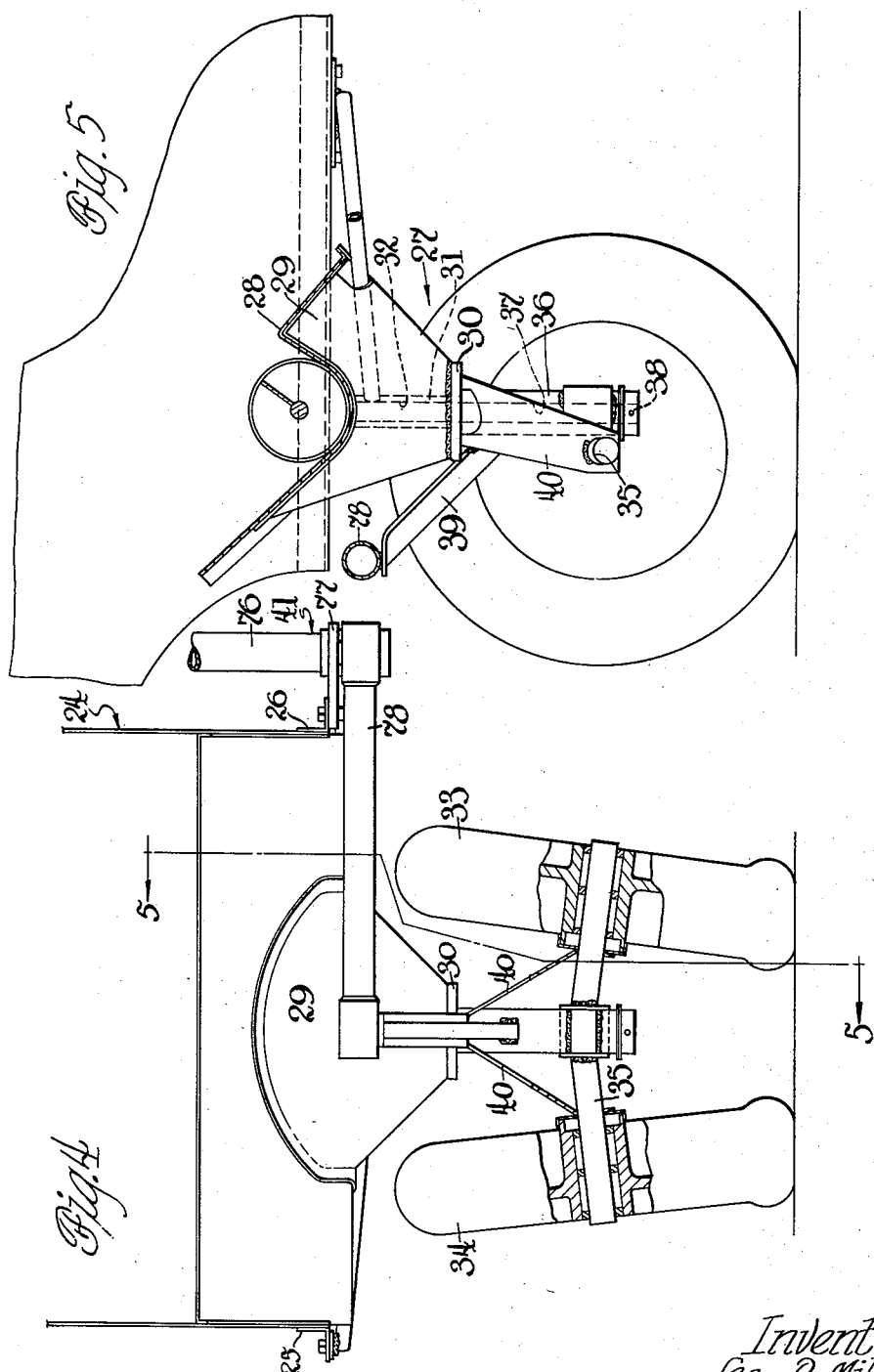

May 4, 1943.  L. P. MILLARD ET AL  2,318,409
SELF-PROPELLED HARVESTER-THRESHER
Filed Oct. 13, 1941  6 Sheets-Sheet 5

Inventors
Lee P. Millard
Stuart S. Pool
By Paul O. Pippel
Atty.

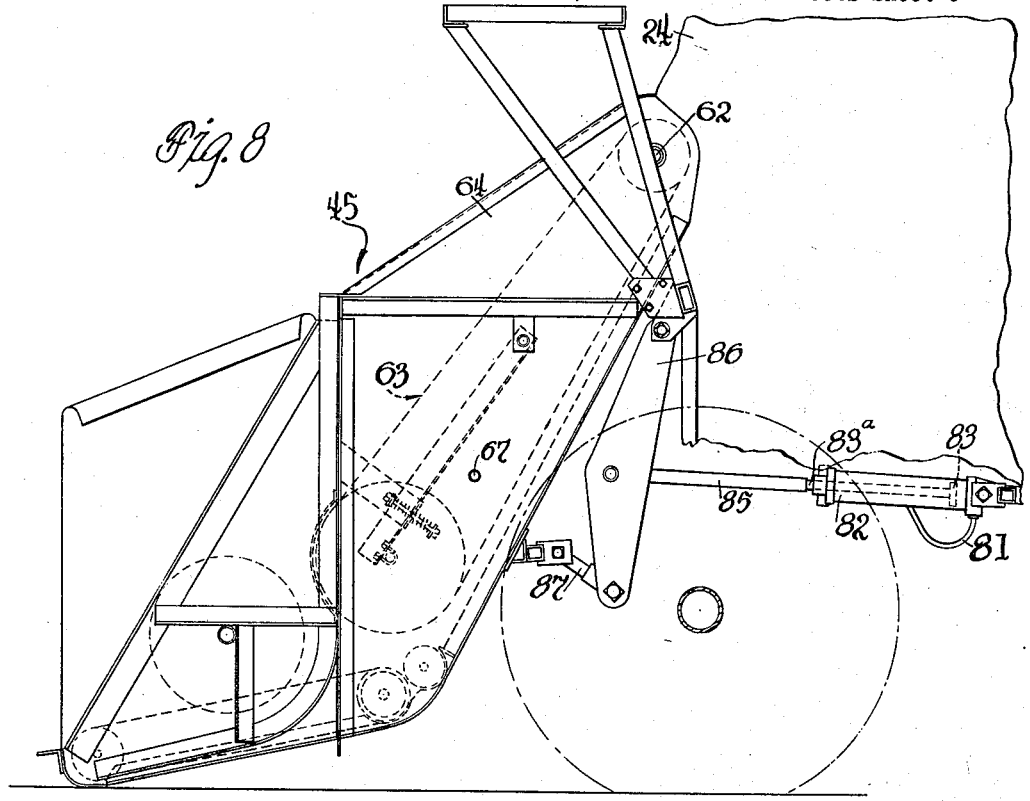
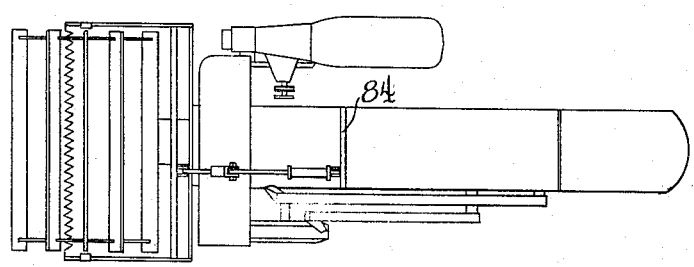

Patented May 4, 1943

2,318,409

UNITED STATES PATENT OFFICE 2,318,409

SELF-PROPELLED HARVESTER-THRESHER

Lee P. Millard and Stuart D. Pool, Moline, Ill., assignors to International Harvester Company, a corporation of New Jersey Application October 13, 1941, Serial No. 414,732

10 Claims. (Cl. 56—20)

This invention relates to harvester threshers. More specifically it relates to improvements in the construction and operation of the self-propelled type harvester thresher.

It is an important object of the present invention to provide a light-weight, self-propelled harvester thresher.

Another object of the present invention is to provide a novel self-propelled harvester thresher which does not employ a frame for supporting the machine, a novel supporting structure being provided for carrying the various utilities for the machine.

Another object of the present invention is to provide a novel rear-wheel mounting for supporting and steering the rear end of the harvester thresher. This rear-wheel mounting also includes novel features by which the frame of the machine is eliminated.

Another object of the present invention is to provide a novel means for adjusting the platform or cutting mechanism of the harvester thresher.

Another object of the present invention includes a novel motor mounting by which the various parts of the thresher may be driven, and also includes drive means for propelling the thresher over the ground.

These and other objects and advantages of the present invention will be apparent to those skilled in the art after a consideration of the following detailed description of the preferred structural embodiment, taken in conjunction with the accompanying drawings.

In the drawings:

Figure 4 is a rear view of the novel wheel mounting for supporting the rear of the separator;

Figure 5 is a sectional view taken along the line 5—5 of Figure 4;

Figure 8 is a side view of the novel power means for adjusting the platform of the harvester thresher; and Figure 9 is a schematic plan view, illustrating the novel power means for raising and lowering the platform of the thresher.

Figure 1:
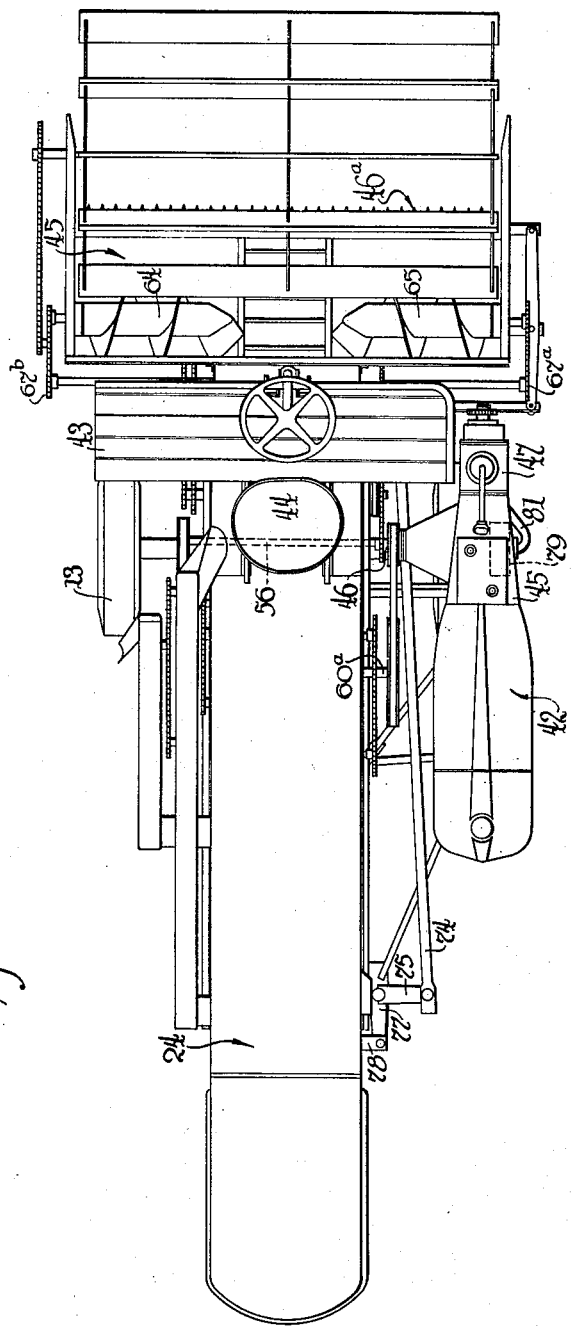
Figure 1 is a top view of a self-propelled harvester thresher embodying the features of the present invention.
Figure 6:
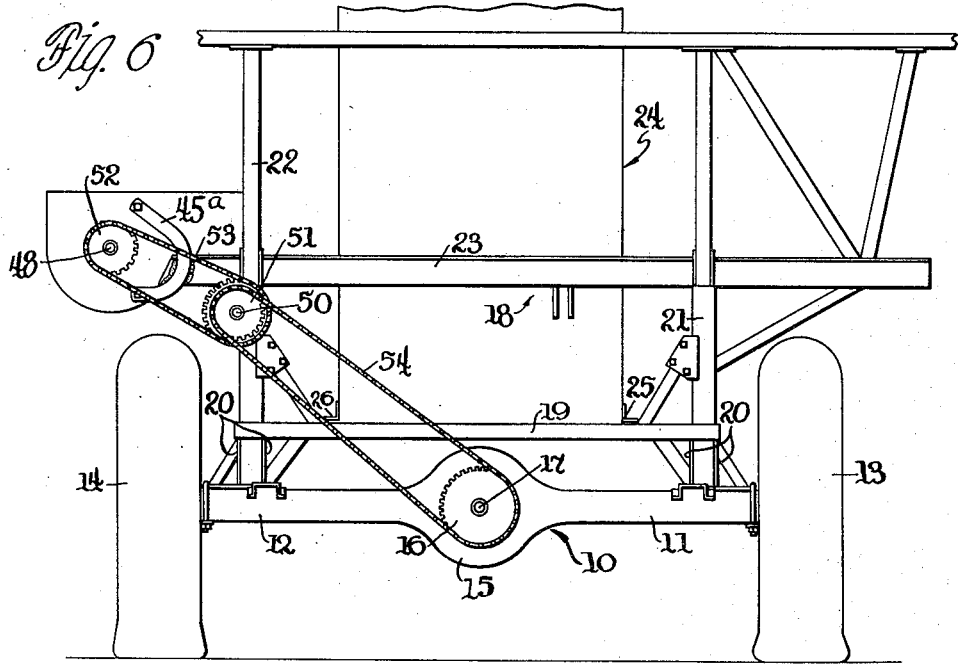
Figure 6 is a view taken along the line 6—6 of Figure 2 and illustrates the novel supporting structure for carrying the utilities of the thresher.

Referring now to the drawings, and more particularly to Figures 1 and 6, it will be seen that the harvester thresher chosen to illustrate the principles of the present invention comprises a transversely positioned axle structure 10, in which is provided axles 11 and 12 on which are secured drive wheels 13 and 14. The axles 11 and 12 are adapted to be driven by a suitable gear drive mechanism located in a housing 15 at the mid-point of the axle structure 10. A sprocket 16 is provided on a shaft 17 which extends from the housing 15. Immediately above the axle structure 10 is provided a supporting structure 18 which comprises a pair of transversely positioned pipes 19, the ends of which are secured to the axle structure 10 by suitable vertical plate members 20. A pair of vertical standards 21 and 22 extend from the ends of the transverse pipes 19, as shown in Figure 6. Somewhat above the pipes 19 extends a transversely positioned member 23 which is connected to the vertical standards 21 and 22 by suitable attaching means. The separator of the harvester thresher, as indicated in Figure 6 and referred to by the numeral 24, is carried on the transversely positioned pipes 19. The separator in the present instance comprises an inverted U-shaped shell housing that is provided with longitudinal angles 25 and 26 along its lower edge. The separator 24 is positioned intermediate the drive wheels 13 and 14, and the angles 25 and 26 are then secured to the transverse pipes 19. As shown in Figure 1, the separator 24 extends rearwardly of the axle structure 10 and is supported at its rear end by a novel wheel support 27.

Referring now to Figures 4 and 5, it will be noted that the wheel-supporting means 27 is carried by the rear transverse tailings auger trough 28. The trough is secured between the angles 25 and 26 and the sides of the separator 24. On the trough 28 and approximately midway between the sides of the separator 24 is secured the member 29 which converges downwardly and has secured at its lower end a part 30 which carries a vertically disposed member 31 provided with a suitable vertical opening 32. A pair of wheels 33 and 34 is journaled on a suitable axle structure 35, from the mid-point of which extends a vertical member 36 provided with a suitable opening 37. A shaft 38 is inserted in the opening 37 in the part 36 and the opening 32 in the part 31, and provides a vertical pivot for the axle 35. An arm 39 extends rearwardly from the member 36. The axle structure 35 is reenforced by suitable plate members 40. A suitable steering device 41 is connected to the arm 39 for moving the wheels 33 and 34 about their vertical journal so as to steer the machine. By this novel rear wheel construction, it is not necessary to provide the usual framework for the rear of the machine, since the separator in this case is supported entirely on the rear wheels 33 and 34. By eliminating the frame, the machine can be made much lighter in weight, which enables the operator of the machine to control it under almost all conditions.

Referring again to Figures 1, 2, and 3, it will be noted that the motor 42 for driving and propelling the harvester thresher over the ground is provided at the right side of the machine, and an operator's platform 43 is provided transversely across the front of the separator, and an operator's station 44 is mounted at the front and top of the separator. At the left side of the machine, a harvester thresher utility, such as the sacking attachment or grain tank, may be provided. However, since their construction is well known, neither is shown. At the front of the separator 24 is pivotally mounted a platform 45 which includes a suitable cutting mechanism 46a for cutting the grain.

Figure 2:
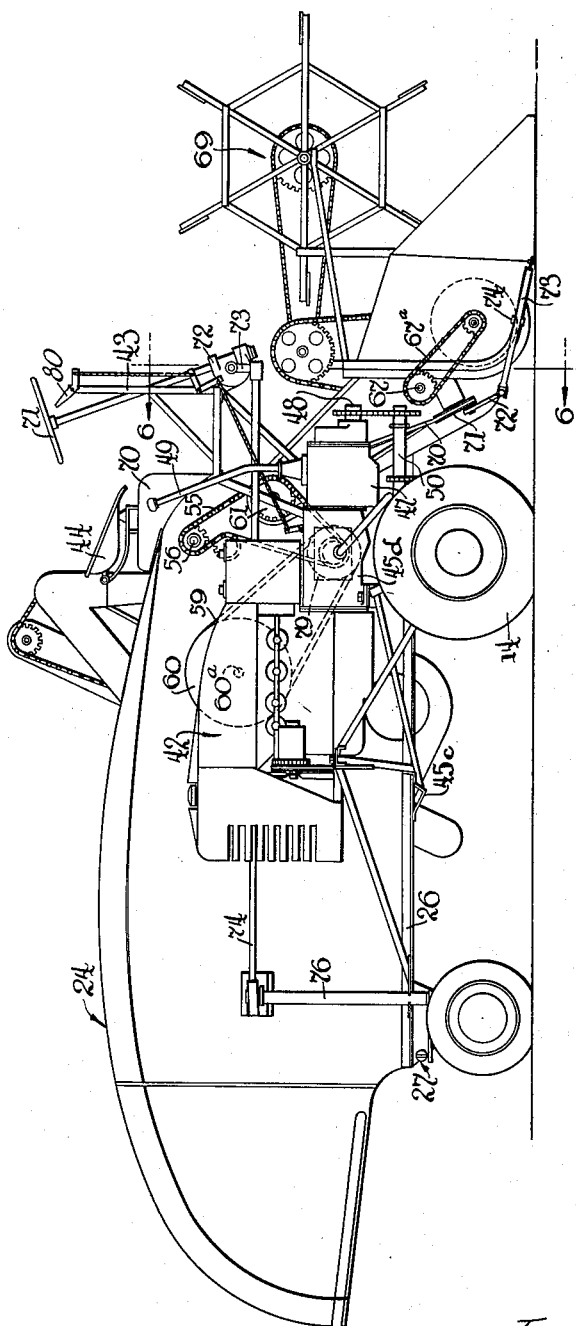
Figure 2 is an elevation of the machine shown in Figure 1, taken from the right side of the machine.
Figure 3:
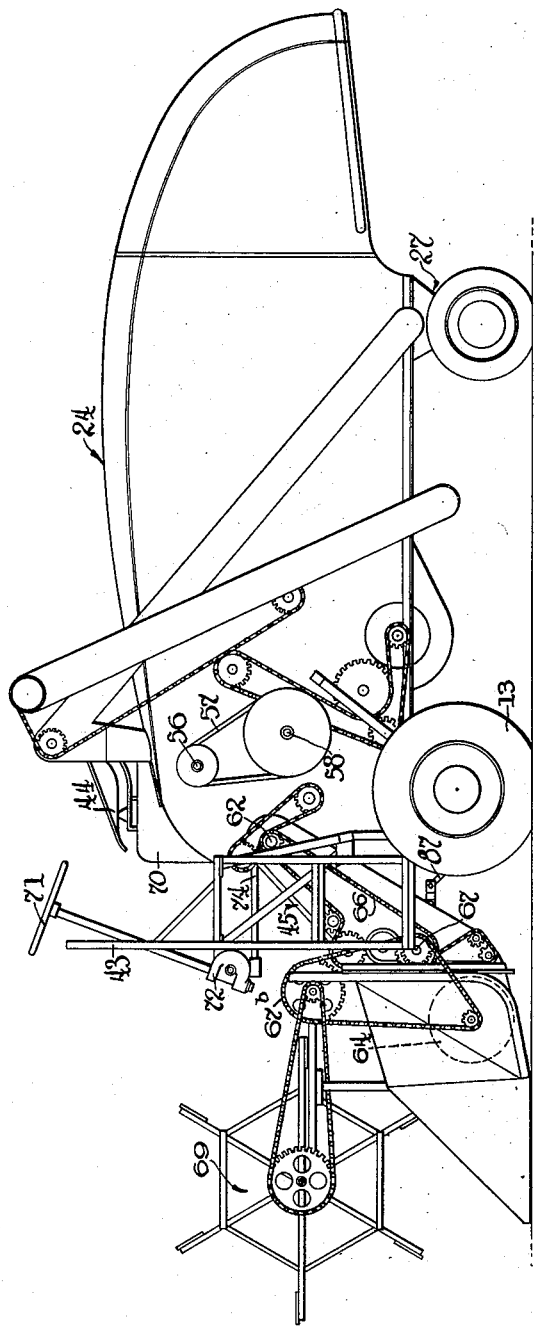
Figure 3 is an elevation of the machine shown in Figure 1, taken from the left side of the machine.
Figure 7:
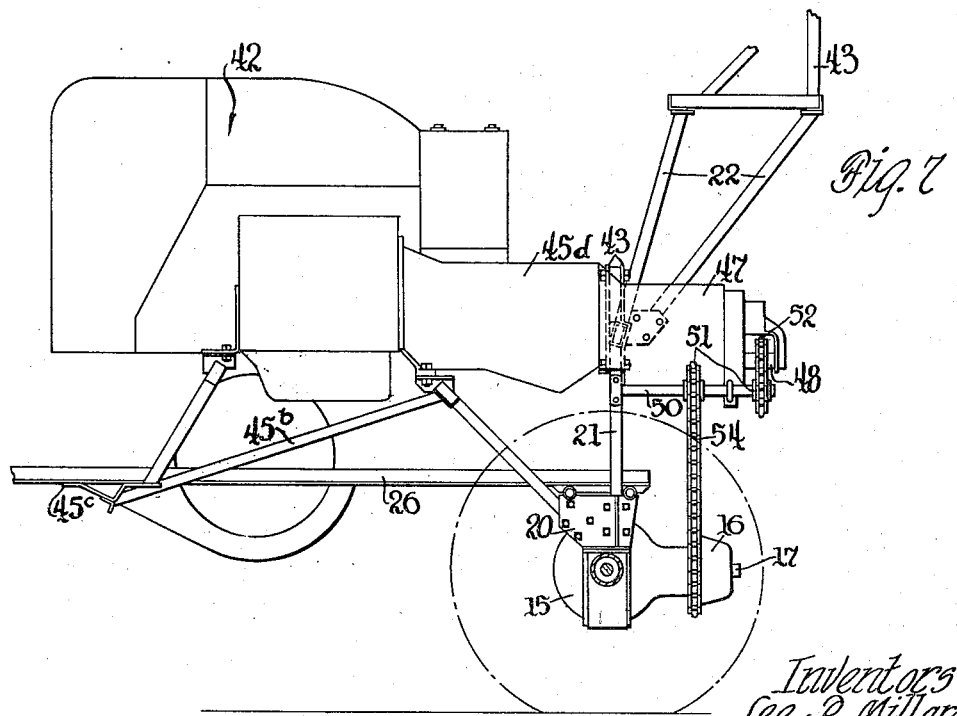
Figure 7 is a side view of the supporting structure construction and motor mounting by which the motor is carried.

The motor mounting is clearly illustrated in Figures 2, 6, and 7. The front end of the motor 42 is secured to a bracket 45a, which is carried by the right-hand end of the transverse member 23, and the intermediate portion, and the rear end of the motor is carried by a brace member 45b, which extends rearwardly and is connected to the longitudinal angle 26 of the separator 24 by a suitable bracket 45c. By mounting the motor in this particular position the wheels 13 and 14 and the various parts of the separator can be driven with a minimum number of drives. For example, as shown in Figures 1 and 2, immediately ahead of the motor 42 is provided a housing 45d from which extends a drive shaft 46. A transmission mechanism 47 is carried immediately ahead of the housing 45. A shaft 48 extends from the transmission 47 by which the wheels 13 and 14 are driven. The transmission is controlled by a suitable gear shift device 49. A jack shaft 50 is carried by the supporting structure 18 and is provided with a pair of sprockets 51, as shown in Figures 6 and 7. A sprocket 52 is secured to the end of the shaft 48 extending from the transmission 47. A suitable chain 53 is trained around the sprocket 52 and one of the sprockets 51, as shown in Figures 2 and 6. The other sprocket 51 on the jack shaft 50 is operatively connected to the sprocket 16 by a chain 54. Upon moving the lever 49 so as to drive the sprocket 52, the jack shaft 50 and the shaft 17 are rotated so as to rotate the wheels 13 and 14 to give motion to the machine. The shaft 46 extending from the housing 45d, through a chain 55, drives a jack shaft 56 journaled transversely in the separator 24. As shown in Figure 3, the jack shaft 56, through a belt 57, drives the cylinder shaft 58. A belt 59, which is trained around a suitable pulley on the shaft 46, on the right side of the machine, drives a pulley 60, which is mounted on a shaft 60a so as to propel the various working parts within the separator 24. The various parts of the platform 45 are driven from the chain 55 which extends around a suitable sprocket 61 provided on the end of a shaft 62 by which the platform 45 is pivotally mounted on the separator 24. The rotation of the shaft 62 drives the undershot conveyer 63 carried by a rearwardly extending housing 64 of the platform 45. Open-end augers 64 and 65, positioned at each end of the platform 45, are driven through a suitable chain 66 driven off of the other end of the shaft 62. The chain 66 drives a shaft 67, which extends through the feeder housing 64, by means of which a chain 67a drives the right-hand auger 65, and a chain 67b drives the left-hand auger 64 and a reel 69 carried by the platform 45. The drive for the cutting mechanism is also taken from the shaft 62, which, through a belt 70, drives a pulley 71 that, through a link 72, moves the cutting mechanism arm 73 about its pivotal connection 74 to the platform 45.

As previously mentioned, the operator's platform 43 and the operator's station 44 are provided at the front of the separator 24 and above the cutting mechanism 46a. By this particular location, the operator always has an unobstructed view of the field ahead of him. In the present instance, the operator's station 44 is pivotally mounted on a suitable supporting structure 70 carried at the front of the separator, by which the operator's seat may be tilted upwardly so as to provide a space for the operator to stand, should it be necessary. A steering wheel 71 is also carried at the front of the machine and comprises a gear case 72 which is secured to an operator's platform 43. A suitable arm 73 extends from the case 72 and is adapted to be moved upon rotation of the steering wheel 71. A rearwardly extending link 74 connects the arm 73 and an arm 75 provided at the upper end of a vertical shaft 76 carried by the separator side. The lower end of the arm 76 is provided also with an arm 77 which is connected by means of a transverse link 78 to the member 39. Upon rotating the steering wheel 71, the supporting wheels 33 and 34 are moved about the vertical pivot 38.

The novel power means for adjusting the platform 45 is shown in Figures 2, 8, and 9. A suitable hydraulic lift device 79 is adapted to be driven from the shaft 46 within the housing 45d. The hydraulic lift 79 is adapted to pump fluid under pressure and is controlled by a suitable lever 80 carried by the operator's platform adjacent the steering wheel 71. The fluid under pressure delivered by the hydraulic lift device 79 passes through a suitable conduit 81, which is connected to a cylinder 82 in which is provided a movable piston 83. As shown in Figure 9, the cylinder 82 is pivotally connected at its rear end to a transverse member 84 secured between the angles 25 and 26 of the separator 24. The piston 83 has a rod 83a which extends forwardly and is inserted in a suitable sleeve member 85 which is pivotally connected to a link member 86. The link member 86 is pivotally connected at its upper end to the transverse member 23. The lower end of the member 86 is pivotally connected to the feeder housing 64 by a suitable link 87. Upon operating the lever 80, fluid is delivered into the cylinder 82, which in turn moves the piston 83 and rod 84 forwardly, which in turn moves the link 86 about its pivotal connection to the transverse member 23. The forward movement of the link 86, through the link 87, moves the platform 45 about its pivotal connection 62 to the separator. As shown in Figure 9, the cylinder 82 is potioned so that the force exerted thereby will raise both ends of the platform 45 the same amount.

In view of the foregoing description, it should be apparent that many novel features have been provided by which a light-weight, self-propelled harvester thresher can be produced. The rear wheel mounting for the separator eliminates the frame, and the simple supporting structure provided at the front of the machine carries the utilities for the harvester thresher. Further, the drive for the various parts have been much simplified by the particular location of the motor, and the lift device has been provided, by which the platform may be readily raised and lowered.

While only a preferred embodiment of the present invention has been shown and described, it is to be understood that various modifications and changes may be made in the structure herein disclosed which still may come within the teachings of this invention, and it is the intention to limit the invention only within the terms of the appended claims.

What is claimed is:

1. In a self-propelled harvester thresher, a transverse axle structure having laterally spaced wheels, a separator positioned intermediate the spaced wheels and extending rearwardly thereof, a transverse supporting structure carried by the axle structure and extending laterally toward each of the supporting wheels, means connecting the front of the separator to the supporting structure, a motor for driving the separator and propelling the harvester thresher carried by the supporting structure at one side of the separator, an operator's platform carried by the supporting structure at the other side of the separator and extending transversely across the front of the separator, a tailings elevator trough positioned at the rear of the separator and secured between the sides thereof, and a steerable wheel structure mounted on the trough.

2. In a self-propelled harvester thresher, a transverse axle structure having laterally spaced wheels, a separator positioned intermediate the wheels and extending rearwardly thereof, a transverse supporting structure carried by the axle structure and extending laterally toward each of the supporting wheels for carrying the utilities of the machine, means connecting the front of the separator to the supporting structure, a tailings elevator trough positioned at the rear of the separator and secured between the sides thereof, and a steerable wheel structure carried by the trough.

3. In a self-propelled harvester thresher, a transverse axle structure having laterally spaced wheels, a separator positioned intermediate the wheels and extending rearwardly thereof, a transverse supporting structure carried by the axle structure and extending laterally toward each of the supporting wheels, means connecting the front of the separator to the supporting structure, a steerable wheel mounted at the rear and beween the sides of the separator for supporting the rear of the separator, a motor for driving the separator and propelling the harvester thresher carried by the supporting structure at one side of the separator, an operator's platform carried by the supporting structure at the other side of the separator and extending transversely across the front of the separator, control means for the harvester carried by the operator's platform, and an operator's station positioned on the top of the separator adjacent the operator's platform.

4. In a harvester thresher, a transverse axle structure having laterally spaced wheels, a separator positioned intermediate the spaced wheels and extending rearwardly thereof, a transverse supporting structure carried by the axle structure and extending laterally toward each of the supporting wheels, means connecting the front of the separator to the supporting structure, means carried by the rear of the separator and positioned between the sides thereof for supporting the rear end of the separator, a motor carried by the supporting structure at one side of the separator for propelling the harvester and driving the separator, an operator's platform carried by the supporting structure at the other side of the separator and extending transversely across the front of the separator, and a platform movably mounted on the front of the separator and extending laterally to each side thereof.

5. In a self-propelled harvester thresher, a separator, a transverse axle structure having laterally spaced drive wheels, a transverse supporting structure carried by the axle structure and extending laterally toward each of the supporting wheels, means connecting the front of the separator to the supporting structure, a motor for driving the separator parts and the drive wheels carried by the supporting structure at one side of the separator, an operator's platform carried by the supporting structure at the other side of the separator and extending transversely across the front of the separator, an operator's station positioned on the top and front portion of the separator, a steerable wheel carried by the rear end of the separator and positioned between the sides thereof for supporting the rear end of the separator, and steering means carried by the operator's platform adjacent the operator's station and operatively connected to said steerable wheel.

6. In a self-propelled harvester thresher, a transverse axle structure having laterally spaced drive wheels, a transverse supporting structure carried by the axle structure and extending laterally toward each of the supporting wheels, means connecting the front of the separator to the supporting structure, a motor positioned at one side of the separator, means connecting one end of the motor to the supporting structure, means connecting the other end of the motor to the separator, means operatively connecting the motor and the separator for driving the parts therein, and means operatively connecting the motor and the drive wheels for propelling the harvester over the ground.

7. In a self-propelled harvester thresher, a transverse axle structure having laterally spaced drive wheels, a transverse supporting structure carried by the axle structure and extending laterally toward each of the supporting wheels, means connecting the front of the separator to the supporting structure, a motor for driving the separator parts and the drive wheels carried by the supporting structure at one side of the separator, an operator's platform carried by the supporting structure at the other side of the separator and extending transversely across the front of the separator, an operator's station positioned adjacent the operator's platform, a steerable wheel carried by the rear end of the separator and positioned between the sides thereof for supporting the rear end of the separator, steering means carried by the operator's platform and operatively connected to said steerable wheel for controlling the direction of travel of the thresher, a platform pivotally connected to the front of the separator and extending laterally to each side thereof, and means driven from the motor and operatively connected to the platform for adjusting the platform.

8. In a self-propelled harvester thresher, a transverse axle structure having laterally spaced drive wheels, a transverse supporting structure carried by the axle structure and extending laterally toward each of the supporting wheels, means connecting the front of the separator to the supporting structure, a motor for driving the separator parts and the drive wheels carried by the supporting structure at one side of the separator, an operator's platform carried by the supporting structure at the other side of the separator and extending transversely across the front of the separator, an operator's station positioned adjacent the operator's platform, a steerable wheel carried by the rear end of the separator and positioned between the sides thereof for supporting the rear end of the separator, steering means carried by the operator's platform and operatively connected to said steerable wheel for controlling the direction of travel of the thresher, a platform pivotally connected to the front of the separator and extending laterally to each side thereof, a cylinder having a piston movably mounted therein operatively connected between the separator and the platform, a hydraulic lift device adapted to be driven from the motor, and means operatively connecting the lift device and the cylinder for supplying fluid under pressure into the cylinder for adjusting the platform about its pivotal connection to the separator.

9. A mobile type harvester thresher comprising a transverse axle structure having laterally spaced drive wheels, a supporting structure carried by the axle structure, and extending toward each of the drive wheels, a separator carried by the axle structure and extending to one side thereof, a steerable wheel structure positioned at the rear of the separator between the sides thereof, a motor for driving the drive wheels and the various parts of the thresher carried by the supporting structure at one side of the separator, a platform pivotally connected to the front of the separator and extending laterally to each side thereof, and a hydraulic lift device adapted to be driven from the motor and operatively connected to the separator and the platform for raising and lowering the platform.

10. A frameless self-propelled harvester thresher comprising a separator, a transverse axle structure having laterally spaced drive wheels, means for securing the separator to the axle structure, a steerable wheel, means for mounting the steerable wheel at the rear of the separator between the sides thereof, a supporting structure carried by the axle structure, a motor carried by the supporting structure at one side of the machine for driving the drive wheels and the separator parts, an operator's platform carried by the supporting structure and extending transversely across the front of the separator, and control means for the harvester carried by the operator's platform.

LEE P. MILLARD.
STUART D. POOL.